PAUL KOELLER
DOUGLAS W. EGGINS
INVENTORS

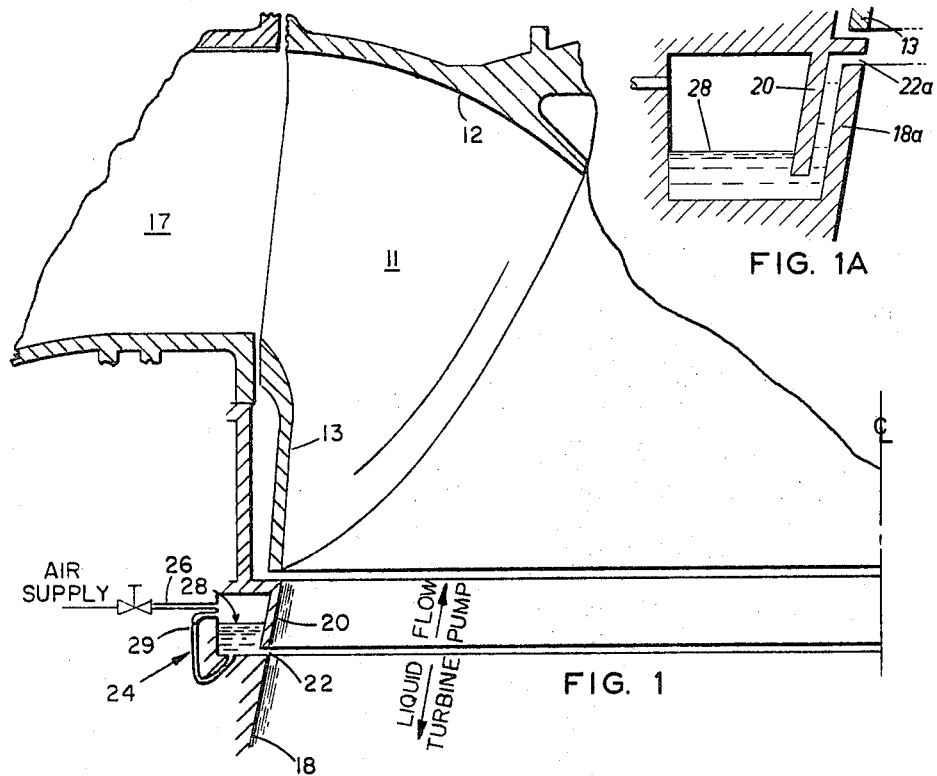
FIG. 1A
FIG. 1
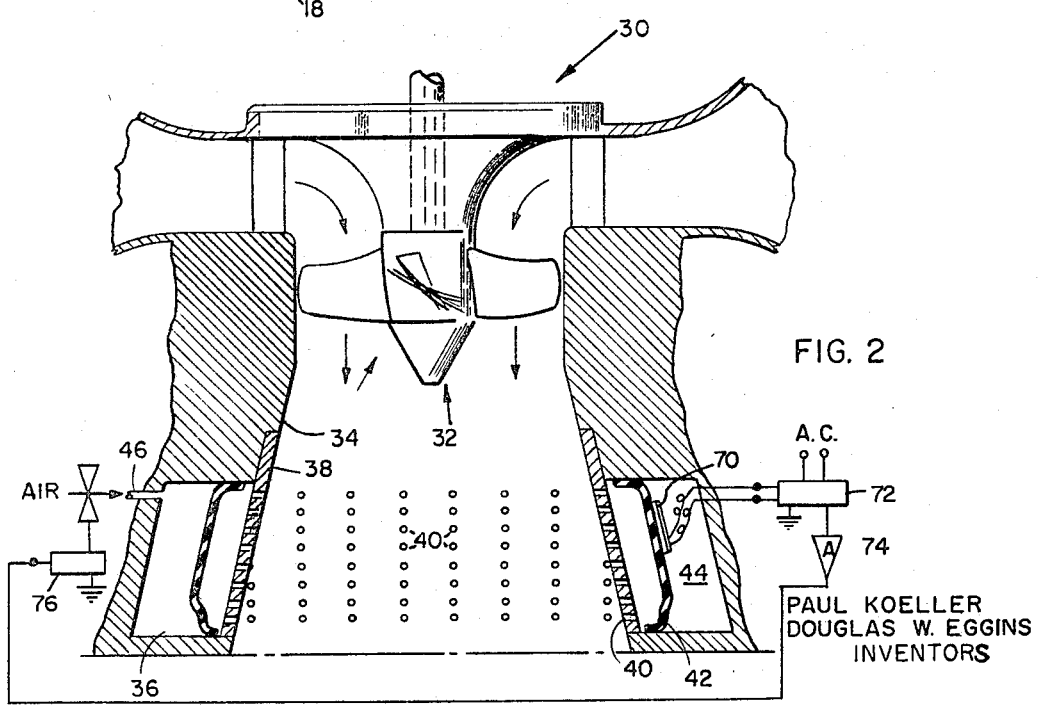
FIG. 2
PAUL KOELLER
DOUGLAS W. EGGINS
INVENTORS Aug. 27, 1968    P. KOELLER ET AL    3,398,932
OSCILLATION DAMPING DEVICE
Filed July 14, 1967    2 Sheets-Sheet 2

PATENT AGENT

United States Patent Office 3,398,932
Patented Aug. 27, 1968

3,398,932
OSCILLATION DAMPING DEVICE
Paul Koeller, Dorval, Quebec, and Douglas W. Eggins, Scarborough, Ontario, Canada, assignors to Dominion Engineering Works, Limited, Lachine, Quebec, Canada, a corporation of Canada
Filed July 14, 1967, Ser. No. 653,439
8 Claims. (Cl. 253—117)

ABSTRACT OF THE DISCLOSURE

For controlling the noise and vibration in a turbo hydraulic machine such as a turbine an oscillation chamber is provided adjacent the machine to damp load and pressure oscillations of the working liquid, particularly when working at less than peak efficiency.

---

This invention is directed to an improved flow system for a turbo machine such as a pump, turbine or pump-turbine and particular to the provision of an oscillation chamber for damping the oscillation of the working liquid.

In the operation of hydraulic turbo machines such as Kaplan machines, Francis turbines and centrifugal pumps and pump turbines etc., the problem of noise generation arises, particularly when working at less than peak efficiency. It has been found that low frequency load and pressure oscillations occur which produce bothersome noise conditions in the vicinity of the machine. This phenomenon of noise generation has been found from observation to be related with the formation of a rotating "rope" adjacent the runner of the machine rotating in the same direction as the runner at part load, and a contra-rotating "torch" formed at load conditions above machine peak efficiency. In addition to causing operator fatigue and a generally unpleasant environment in the vicinity of the machine under adverse loading conditions, it is also open to question that the vibrations may lead to forms of wear or damage not presently identified with this phenomenon.

The present invention provides an improved flow system for a turbo hydraulic machine having an oscillation damping chamber in fluid flow relation with the main working fluid to diminish oscillation of the working liquid. Thus there is provided an improved flow passage for use with a hydraulic turbo machine having a runner rotatably mounted within the fixed casing, comprising a chamber in restrictive flow communication with the main flow passage for working liquid, and compressible means occupying at least a portion of the chamber to permit the interchange of the working liquid between the main flow passage and the chamber in oscillation damping relation. In particular there is provided an annular communicating passage surrounding the main flow path of a hydraulic machine and connecting with a chamber containing a compressible fluid such as air, together with means to control the supply of air to the space in accordance with the fluid-liquid head relationship within the chamber, whereby the supply of gas to the chamber may be regulated.

Figure 3:
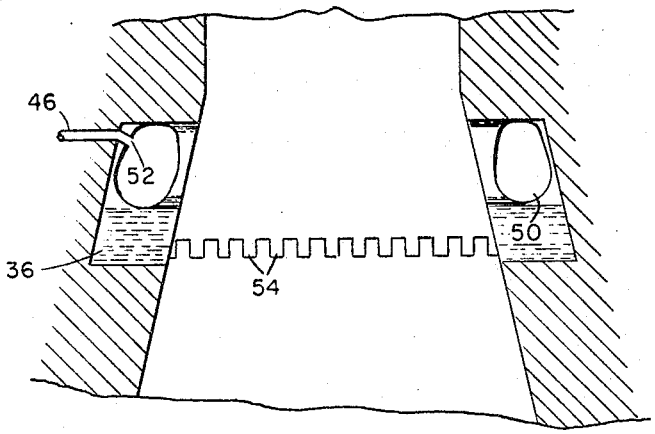
Figure 4:
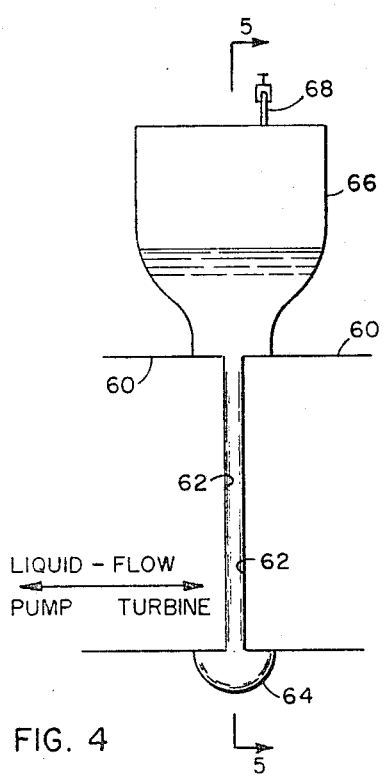
Figure 5:
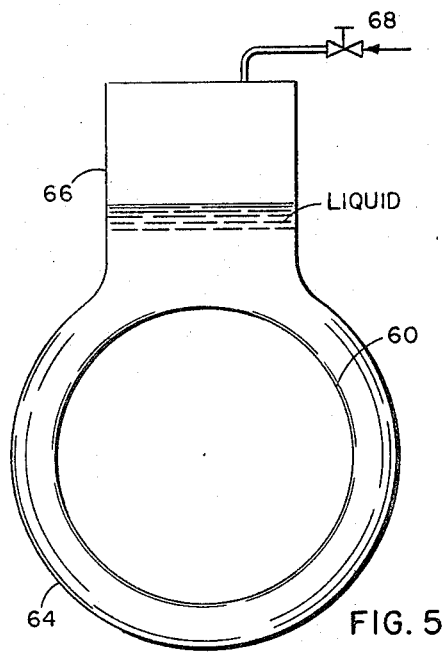

Certain embodiments of the present invention are described, reference being had to the accompanying drawings wherein:

FIGURE 1 shows an oscillation damping arrangement in the draft tube of a Francis type machine;
FIGURE 1a is an alternative arrangement to that of FIGURE 1;
FIGURE 2 shows an oscillation damping arrangement in relation to a Kaplan type machine;
FIGURE 3 is an alternative arrangement of the oscillation damping device;
FIGURE 4 is a transverse view of an alternative arrangement of the device; and
FIGURE 5 is a view on the line 5—5 of FIGURE 4.

Referring to FIGURE 1 a portion of a turbine or pump runner 10 is shown having blades 11 extending between a crown shroud 12 and a band shroud 13, as for a Francis turbine or a centrifugal pump or a dual purpose machine of this type. The working liquid passes through housing inlet 17 and a draft tube 18 having a throat portion 20. An annular slot 22 extends through the walls of the draft tube 18, connecting with an annular chamber 24 to which an air supply pipe 26 connects, being located above the water level 28, while a polyethylene "sight glass" 29 provides ready determination of the fluid-liquid head relationship within the chamber 24. In the alternative arrangement shown in FIGURE 1a the wall portion 18a of the draft tube forms and annular slot 22a adjacent the runner skirt 13a. A depending baffle wall 20a prevents the escape of air from the chamber directly through the slot 22a. This arrangement provides minimum distance between the runner of the machine and the oscillation damping chamber.

Referring to FIGURE 2, the turbine 30 comprises a runner 32 rotatably suspended above a diverging draft tube 34 about which an annular chamber 36 extends. The chamber 36 is separated from the draft tube 34 by means of a cover plate 38 having a plurality of perforations extending therethrough to provide access of the working liquid to the chamber 36. An annular diaphragm 42 divides the chamber 36 to form an air space 44 having an air supply pipe 46 connected thereto.

Referring to the embodiment illustrated in FIGURE 3, on the second sheet of drawings, an annular bladder member 50 is provided with an air supply connection 52. Access of the main working liquid to the chamber 36 is connected by the inlet skirt crenelations 54. In this embodiment, in the event of failure of the bladder 50, the air chamber 36 can continue to function in the manner of the arrangement shown in FIGURE 1, while replacement of the bladder from the draft tube by passage beneath the crenelations 54 can be carried out when the machine is effectively dewatered.

Referring to the embodiment illustrated in FIGURE 4, the pipeline 60, which may comprise a part of a pump or turbine case, or a penstock has an annular slot between the facing end walls 62 about which the annulus wall 64 extends, and connecting with the chamber 66 to which an air supply 68 is connected. The section on the line 5—5 of FIGURE 4 more clearly shows the arrangement, and it will be understood that a loose diaphragm of the "floating" type may be employed to provide complete separation of the liquid from the gas.

Tests have shown that in operation the use of a damping chamber can produce a reduction of up to 60% in pressure fluctuations. The particular advantage of the embodiments incorporating a diaphragm or other separation membrane is that the compressible fluid, generally air, is prevented from washing out under the operation of the rotating rope or torch.

Referring to the "sight glass" 29 provided in the embodiment illustrated in FIGURE 1, it is further contemplated that a tension-sensitive strain gauge 70 may be affixed to the diaphragm 42 of the FIGURE 2 embodiment or to the bladder 50 of the FIGURE 3 embodiment, having an output, responsive to the extension of the flexible member, connected in controlling relation with the air supply by way of power supply 72, amplifier 74 and air control servo valve 76, to control the gas to liquid pressure head relation. The provision of an over-pressure gas or air release to prevent undue extension of the flexible member is also contemplated.

What we claim as new and desire to secure by Letters Patent in the United States is:

1. In a hydraulic turbo machine having a bladed runner rotatably mounted within a fixed casing, an inlet and an outlet to said casing for the passage of working liquid therebetween in energy transfer relation with the blades of said runner, the improvement comprising an oscillation damping chamber arranged in restrictive flow communication with said working liquid when the machine is in operation, gas admission means providing compressed gas to a portion of said chamber, and gas barrier means to limit the loss of gas from said chamber, the pressure of said gas being regulated to permit restrictive flow of said working liquid into and from said chamber, the chamber being of sufficient size to effectively damp low frequency oscillation in said working liquid, whereby the propagation of low frequency noise at machine part-load is substantially reduced.

2. The hydraulic turbo machine as claimed in claim 1 wherein said chamber is located at the low pressure side of said runner, having a liquid seal at the chamber entrance communicating with said working liquid, to minimize loss of said gas from the chamber.

3. The hydraulic turbo machine as claimed in claim 2 wherein said chamber communicates with said working liquid by annular passage means surrounding the low pressure connection to the machine.

4. The hydraulic turbo machine as claimed in claim 1 having a substantially gas impermeable deformable diaphragm means within said chamber to maintain said gas within said chamber in energy transfer relation with said working liquid.

5. The hydraulic turbo machine as claimed in claim 4 wherein said diaphragm means is arranged as an annular partition within said chamber to divide the chamber into a gas containing portion and a liquid receiving portion, the chamber being of annular form having said gas admission means connected to said gas containing portion.

6. The hydraulic turbo machine as claimed in claim 4 wherein said diaphragm means is of donut form, having said gas admission means communicating therewith.

7. The hydraulic turbo machine as claimed in claim 4 including means to control the gas to liquid pressure head relation.

8. The hydraulic turbo machine as claimed in claim 7 wherein said gas to liquid control means includes a tension sensitive sensor responsive to the condition of said diaphragm means connected in controlling arrangement with said gas admission means.

References Cited
UNITED STATES PATENTS

| | | | |
|---|---|---|---|
| 1,791,585 | 2/1931 | Terry | 253—117 |
| 2,054,142 | 9/1936 | Sharp | 253—117 |
| 3,044,744 | 7/1962 | Berlyn | 253—117 X |
| 3,239,193 | 3/1966 | Kerensky | 253—117 X |

EVERETTE A. POWELL, JR., *Primary Examiner.*